US010256533B2

(12) United States Patent
Hirabayashi et al.

(10) Patent No.: US 10,256,533 B2
(45) Date of Patent: Apr. 9, 2019

(54) ANTENNA DEVICE

(71) Applicant: SONY CORPORATION, Tokyo (JP)

(72) Inventors: Takayuki Hirabayashi, Tokyo (JP); Hiroyuki Shigei, Tokyo (JP); Rikiya Ishikawa, Kanagawa (JP); Yu Togasaki, Kanagawa (JP); Osamu Kozakai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 49 days.

(21) Appl. No.: 15/308,469

(22) PCT Filed: Apr. 22, 2015

(86) PCT No.: PCT/JP2015/002201
§ 371 (c)(1),
(2) Date: Nov. 2, 2016

(87) PCT Pub. No.: WO2015/194083
PCT Pub. Date: Dec. 23, 2015

(65) Prior Publication Data
US 2017/0062918 A1 Mar. 2, 2017

(30) Foreign Application Priority Data
Jun. 16, 2014 (JP) ................................ 2014-123565

(51) Int. Cl.

| | |
|---|---|
| ***H01Q 1/12*** | (2006.01) |
| ***H01Q 1/22*** | (2006.01) |
| ***H01Q 1/27*** | (2006.01) |
| ***H01Q 1/32*** | (2006.01) |
| ***H01Q 1/36*** | (2006.01) |
| ***H01Q 1/44*** | (2006.01) |
| ***H01Q 9/14*** | (2006.01) |
| ***H04B 1/3827*** | (2015.01) |

(Continued)

(52) U.S. Cl.
CPC .......... *H01Q 1/362* (2013.01); *H01Q 1/2291* (2013.01); *H01Q 1/273* (2013.01); *H01Q 1/48* (2013.01); *H01Q 9/14* (2013.01); *H01Q 21/28* (2013.01)

(58) Field of Classification Search
CPC ..................................................... H01Q 1/273
USPC ......................................................... 343/718
See application file for complete search history.

(56) References Cited

U.S. PATENT DOCUMENTS

| | | |
|---|---|---|
| 4,754,285 A | 6/1988 | Robitaille |
| 4,769,656 A | 9/1988 | Dickey |
| 5,008,864 A | 4/1991 | Yoshitake |

(Continued)

FOREIGN PATENT DOCUMENTS

| | | |
|---|---|---|
| EP | 0 279 054 A1 | 8/1988 |
| EP | 1 329 985 A2 | 7/2003 |

(Continued)

OTHER PUBLICATIONS

International Search Report dated Jul. 28, 2015 in PCT/JP2015/002201 filed Apr. 22, 2015.

*Primary Examiner* — Ricardo I Magallanes
(74) *Attorney, Agent, or Firm* — Xsensus, LLP

(57) ABSTRACT

An antenna device includes at least one antenna that transmits and receives communication signals, and a helix ground plate connected to the at least one antenna. The helix ground plate includes an overlapping part, and has a length of at least one-quarter of a wavelength of a lowest-frequency in the communication signals.

17 Claims, 11 Drawing Sheets

(51) Int. Cl.

| | |
|---|---|
| ***H01Q 1/48*** | (2006.01) |
| ***H01Q 21/28*** | (2006.01) |

(56) References Cited

U.S. PATENT DOCUMENTS

| | | | | | |
|---|---|---|---|---|---|
| 5,134,418 | A * | 7/1992 | Gomez | H01Q 1/273 | 343/718 |
| 6,366,250 | B1 * | 4/2002 | McConnell | H01Q 1/273 | 343/718 |
| 6,373,439 | B1 * | 4/2002 | Zurcher | G04B 47/00 | 343/702 |
| 2003/0179143 | A1 | 9/2003 | Iwai et al. | | |
| 2006/0047327 | A1 * | 3/2006 | Colvin | A61B 5/076 | 607/60 |
| 2007/0252773 | A1 * | 11/2007 | Soler Castany | H01Q 1/242 | 343/846 |
| 2012/0056792 | A1 | 3/2012 | Han | | |
| 2015/0364822 | A1 * | 12/2015 | O'Driscoll | H01Q 7/005 | 343/718 |

FOREIGN PATENT DOCUMENTS

| | | | |
|---|---|---|---|
| JP | 2009-075138 | A | 4/2009 |
| JP | 2011-166820 | A | 8/2011 |
| JP | 2013-030920 | A | 2/2013 |

* cited by examiner

[Fig. 1]
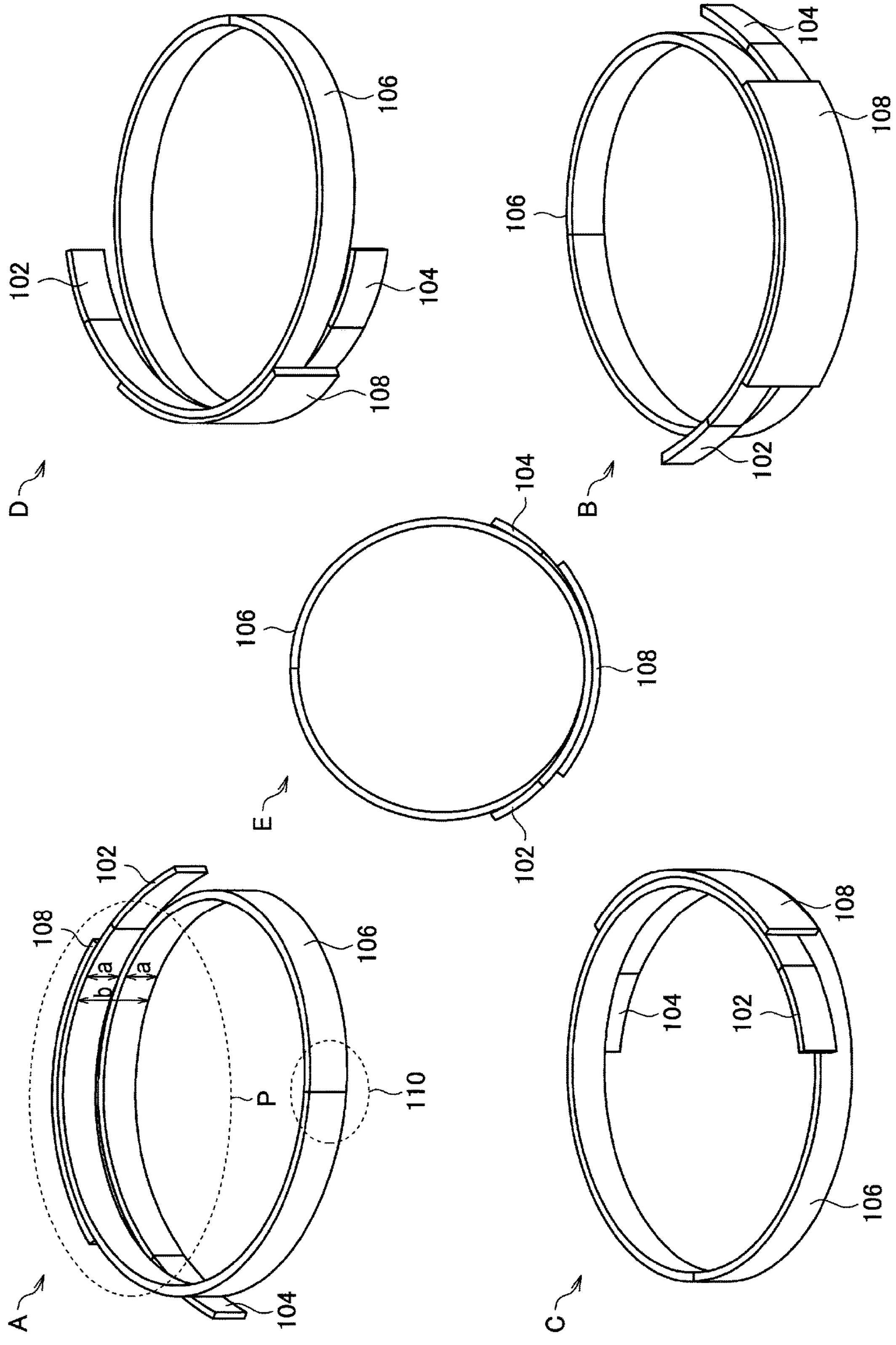

[Fig. 2]
A
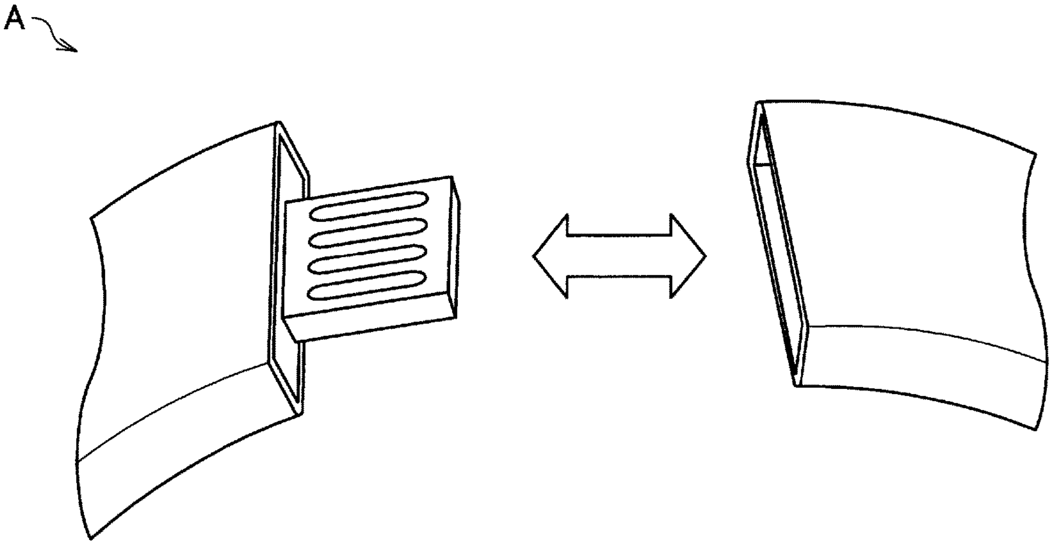
B
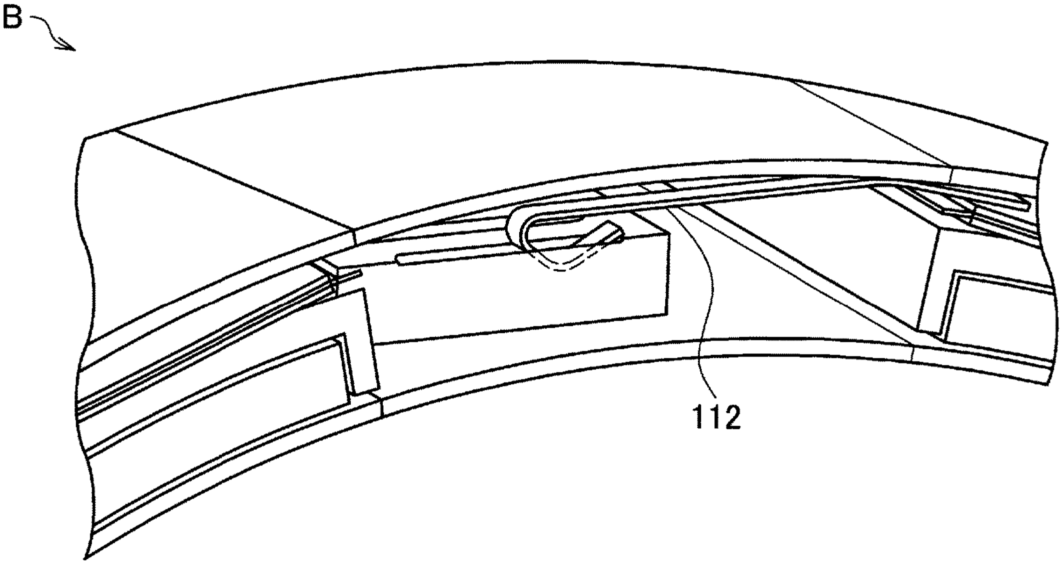

[Fig. 3]
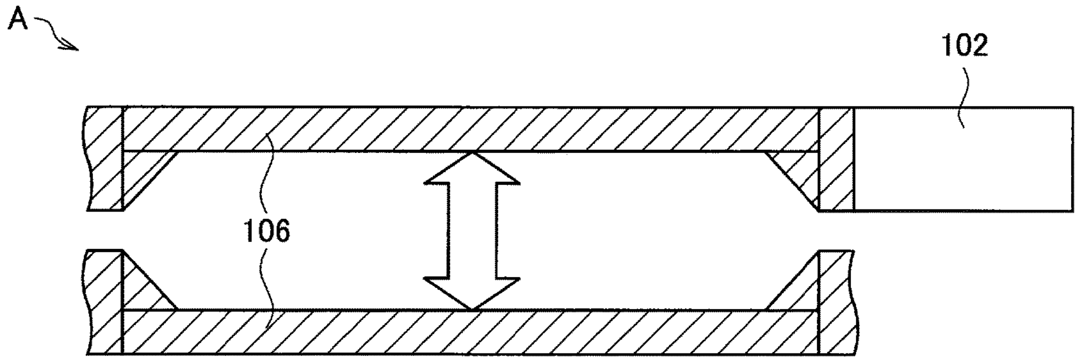
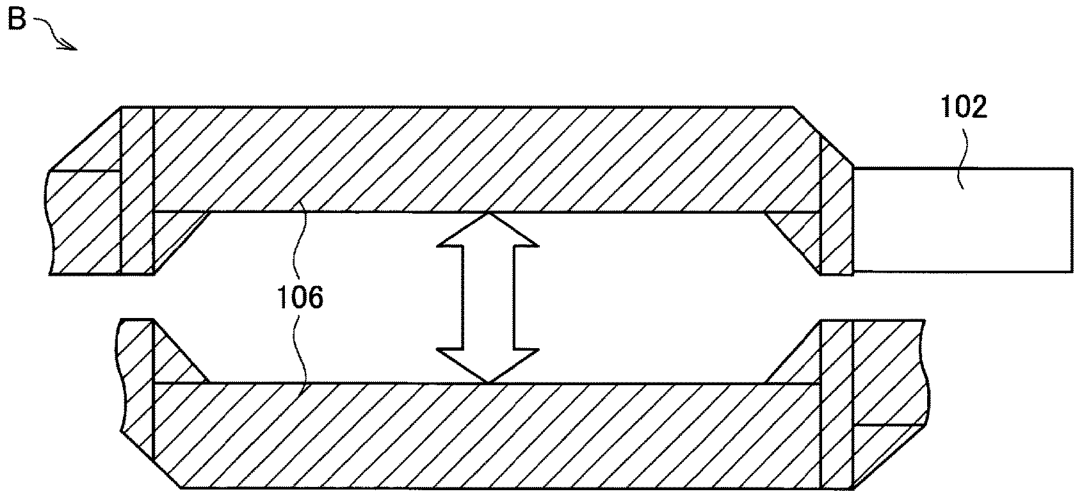

[Fig. 4]
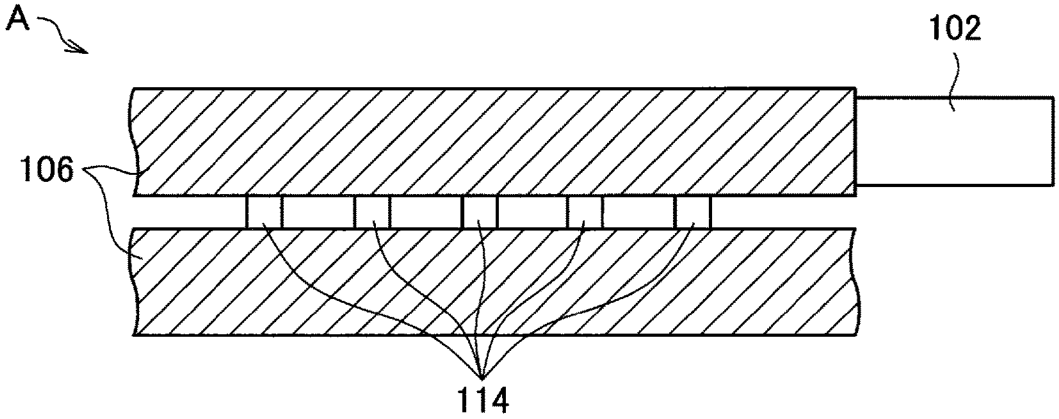
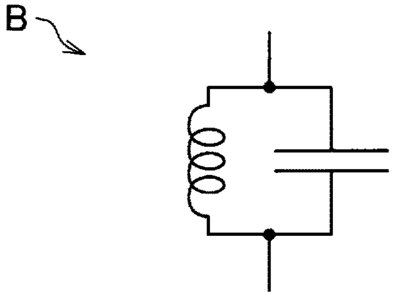
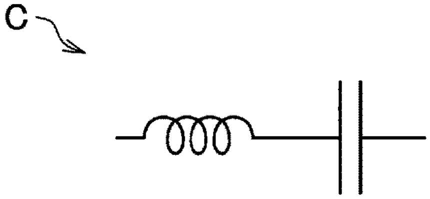

[Fig. 5]
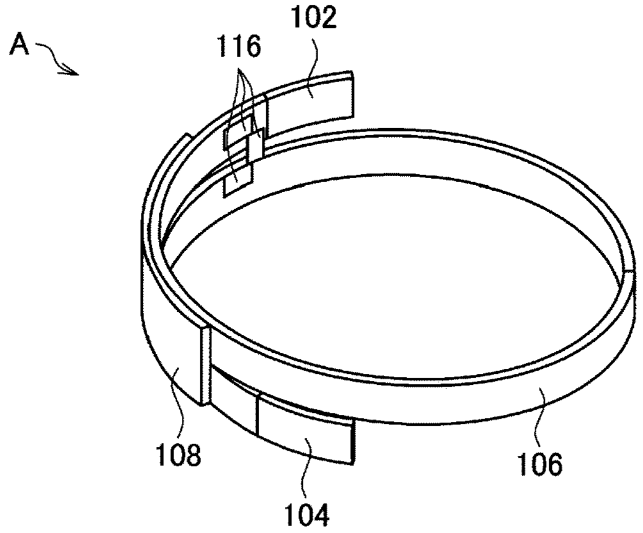
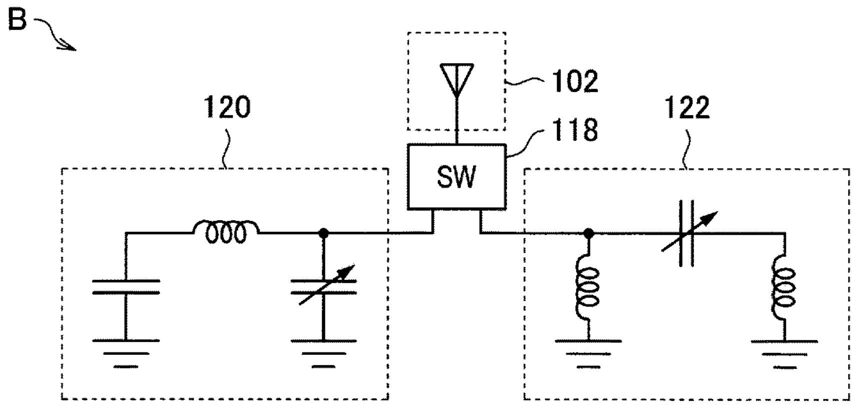
[Fig. 6]
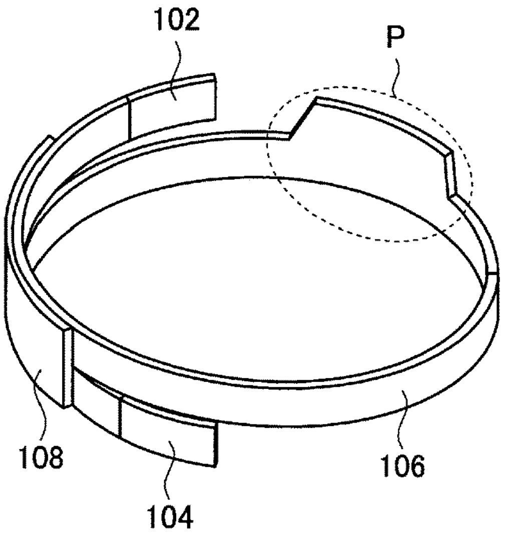

[Fig. 7]
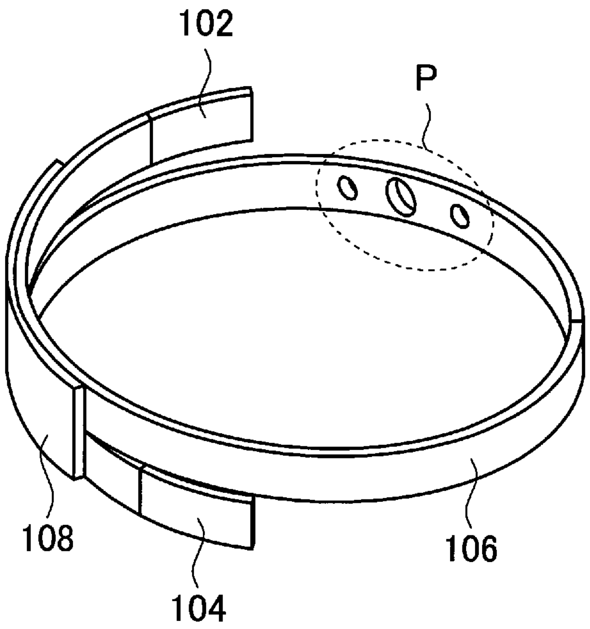

[Fig. 8]
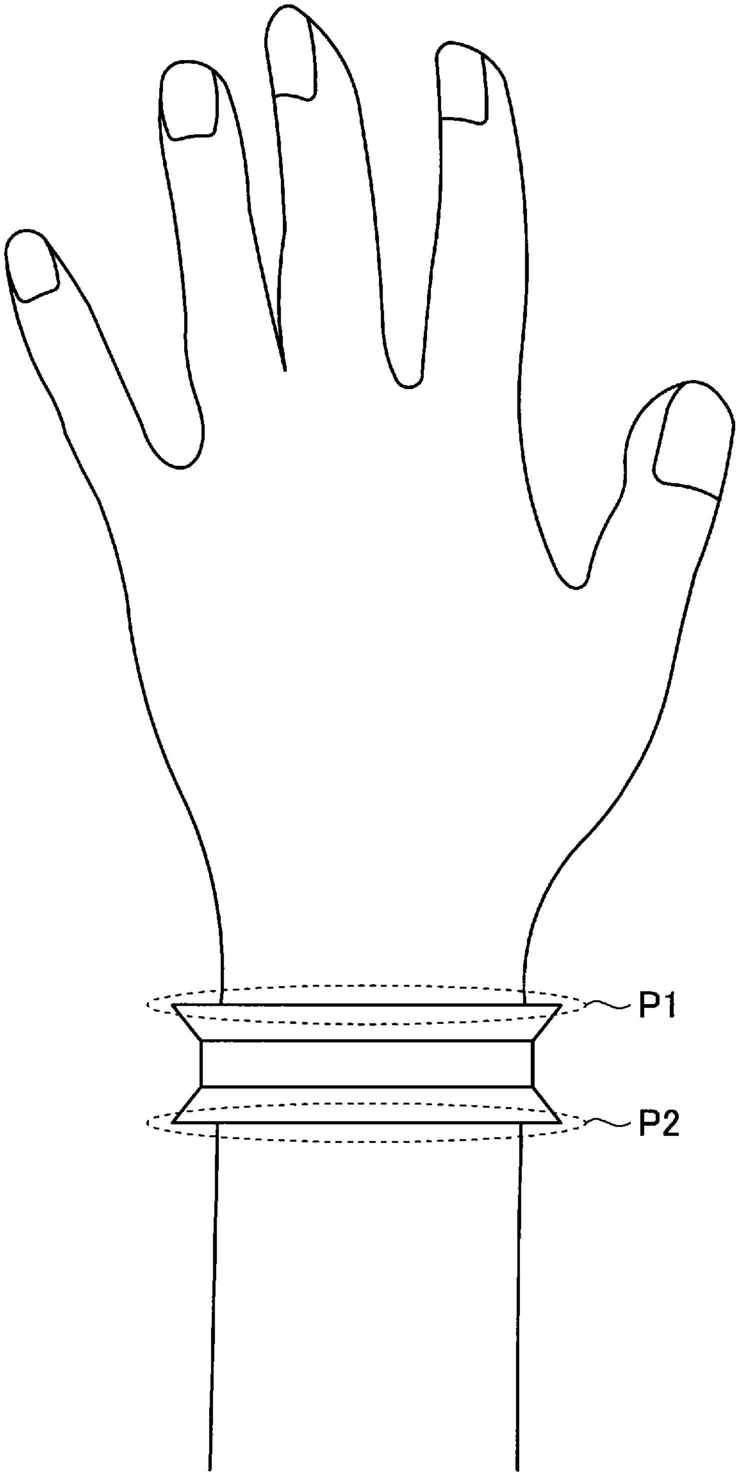

[Fig. 9]
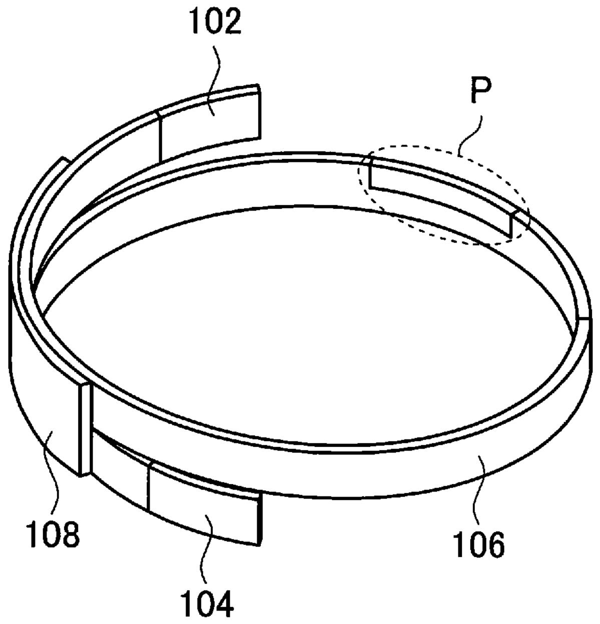
[Fig. 10]
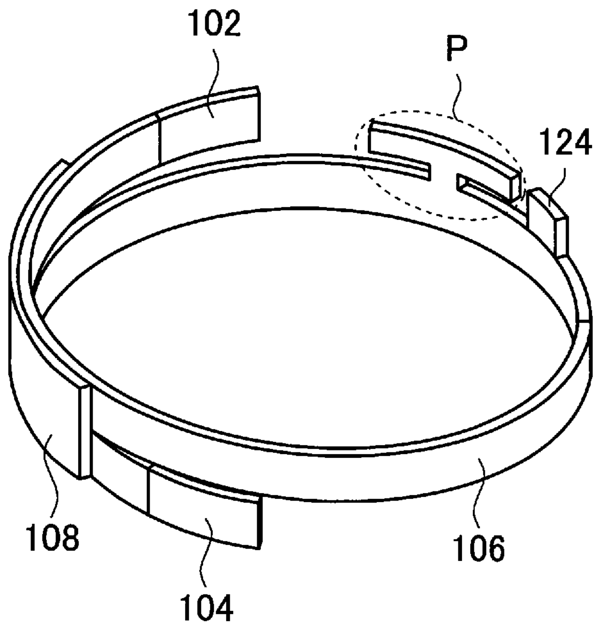

[Fig. 11]
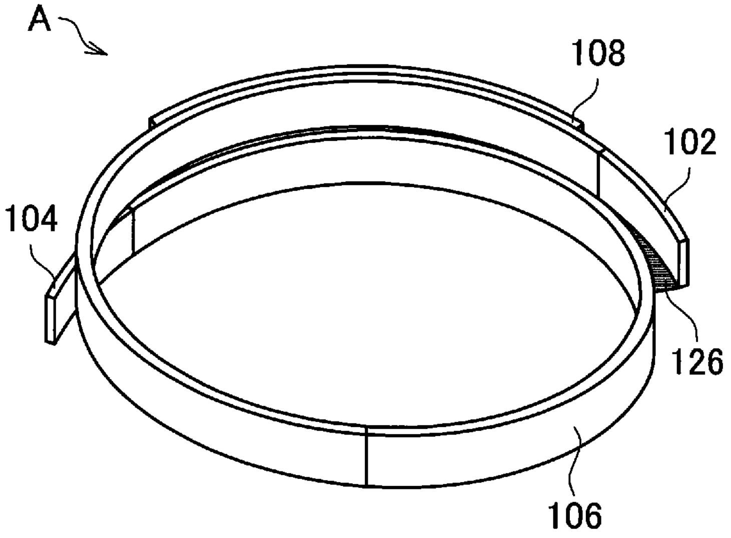
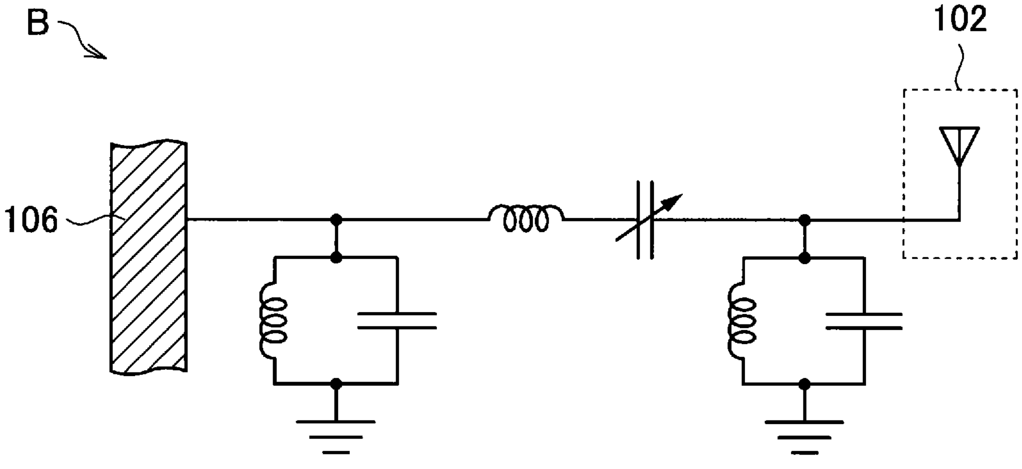

[Fig. 12]
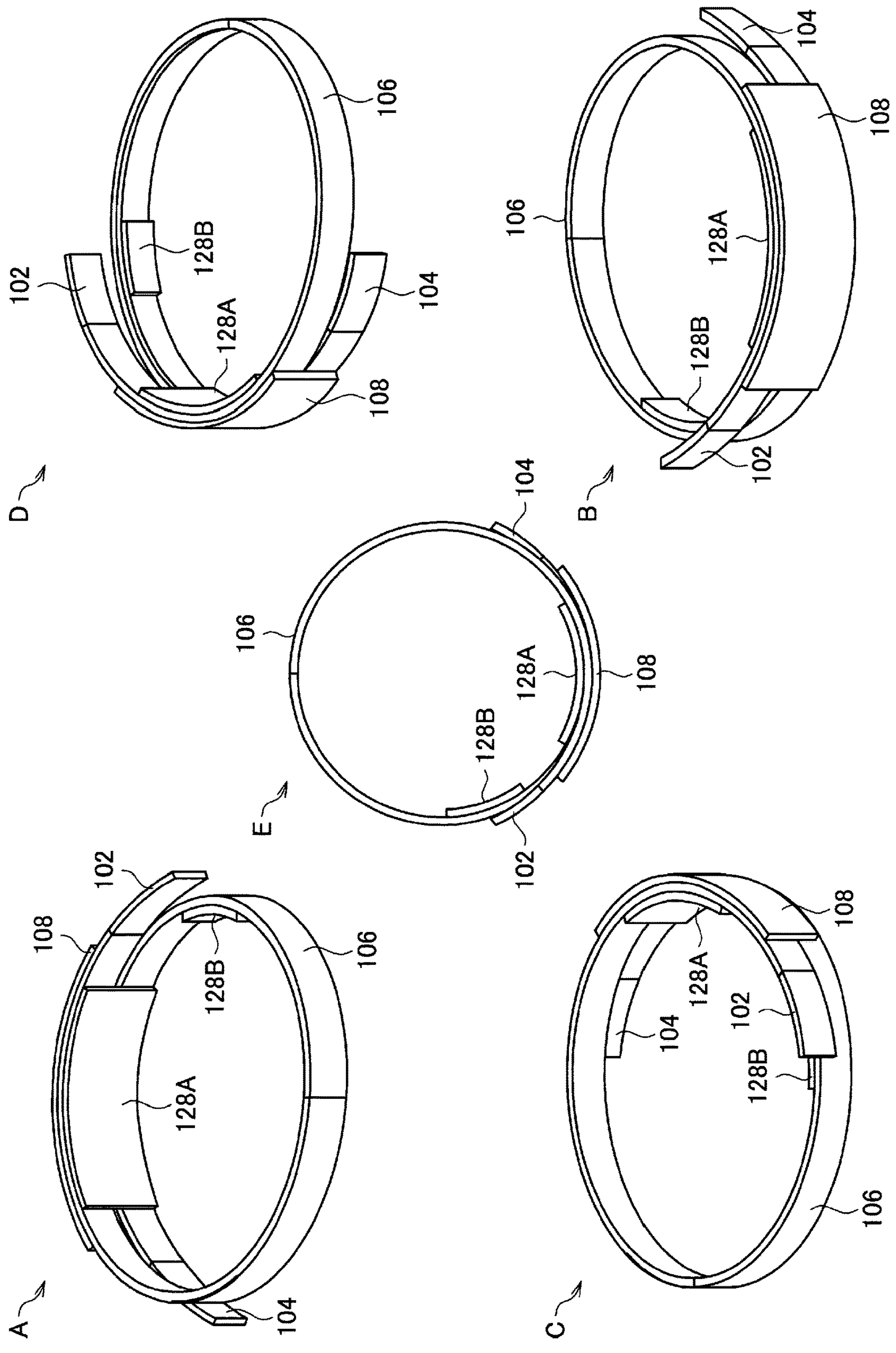

[Fig. 13]
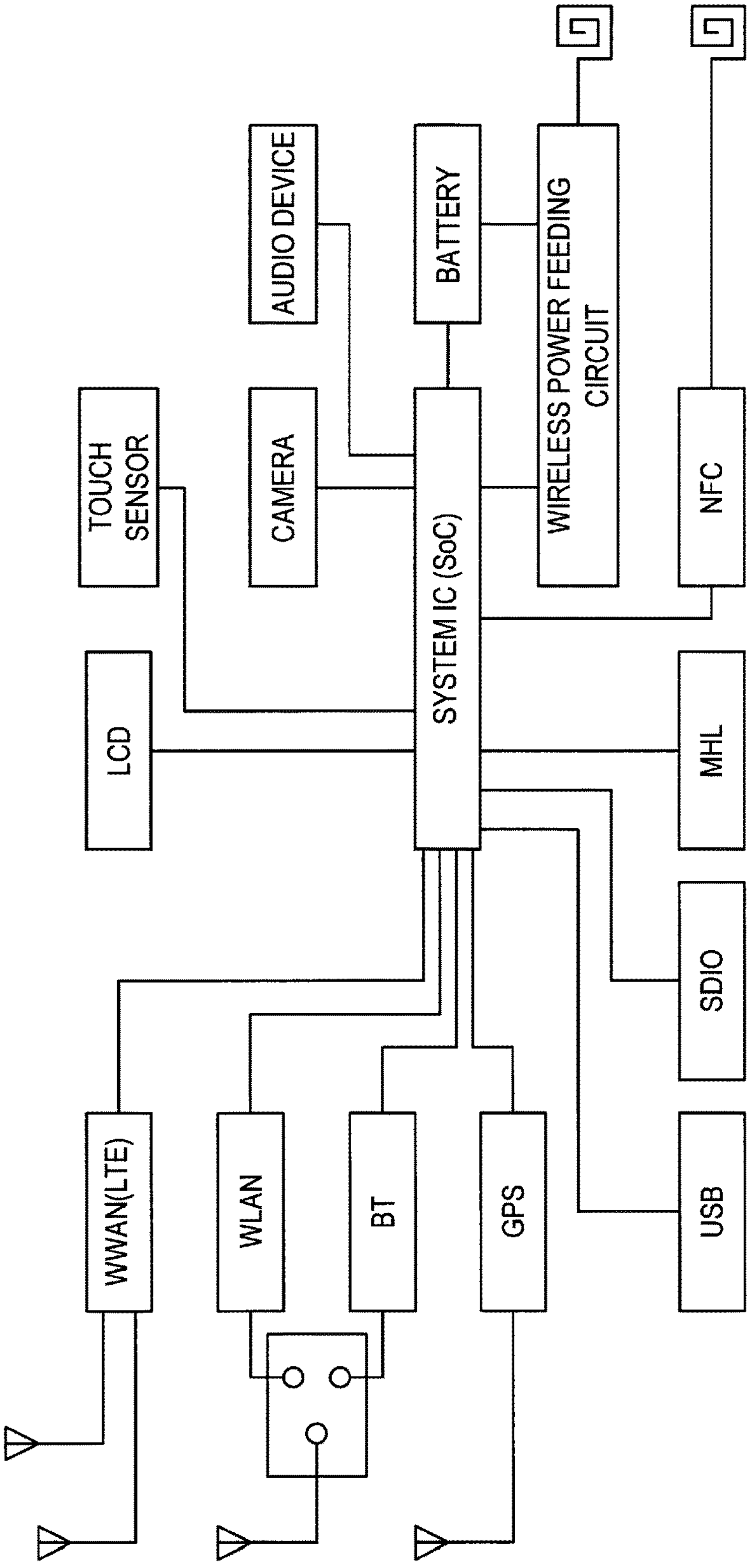

ANTENNA DEVICE

CROSS REFERENCE TO RELATED APPLICATIONS

This application claims the benefit of Japanese Priority Patent Application JP 2014-123565 filed Jun. 16, 2014, the entire contents of which are incorporated herein by reference.

TECHNICAL FIELD

The present disclosure relates to an antenna device.

BACKGROUND ART

In recent years, a technology relevant to an antenna for wireless communication, which can be applied to a wearable device (device that a user can wear to use), such as a device of a watch type and a device of a glasses type, has been developed. Technologies relevant to the above antenna are, for example, the technologies described in below Patent Literatures 1 to 3.

CITATION LIST

Patent Literature

PTL 1: JP 2009-75138A
PTL 2: JP 2011-166820A
PTL 3: JP 2013-30920A

SUMMARY

Technical Problem

Wireless communication uses a comparatively wide band such as several hundred MHz to several GHz, for example. An antenna device having characteristics corresponding to such a wide band is desired.

The present disclosure proposes a novel and improved antenna device.

Solution to Problem

In one exemplary aspect, an antenna device includes at least one antenna that transmits and receives communication signals, and a helix ground plate connected to the at least one antenna. The helix ground plate includes an overlapping part, and has a length of at least one-quarter of a wavelength of a lowest-frequency in the communication signals.

In another exemplary aspect, a device includes at least one antenna that transmits and receives communication signals, and a helix ground plate connected to the at least one antenna. The helix ground plate includes an overlapping part and having a length of at least one-quarter of a wavelength of a lowest-frequency in the communication signals. The device also includes a display.

Advantageous Effects of Invention

According to the present disclosure, an antenna device having characteristics corresponding to a comparatively wide band such as several hundred MHz to several GHz is provided.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 1 is an explanatory diagram illustrating an example of a structure of an antenna device according to a first embodiment.

FIG. 2 is an explanatory diagram illustrating an example of a structure of a joint part according to the present embodiment.

FIG. 3 is an explanatory diagram illustrating an example of a structure of an antenna device according to a second embodiment.

FIG. 4 is an explanatory diagram illustrating a first example of an antenna device according to a third embodiment.

FIG. 5 is an explanatory diagram illustrating a second example of the antenna device according to the third embodiment.

FIG. 6 is an explanatory diagram illustrating an example of a structure of an antenna device according to a fourth embodiment.

FIG. 7 is an explanatory diagram illustrating an example of a structure of an antenna device according to a fifth embodiment.

FIG. 8 is an explanatory diagram illustrating an example of a structure of an antenna device according to a sixth embodiment.

FIG. 9 is an explanatory diagram illustrating an example of a structure of an antenna device according to a seventh embodiment.

FIG. 10 is an explanatory diagram illustrating an example of a structure of an antenna device according to an eighth embodiment.

FIG. 11 is an explanatory diagram illustrating an example of a structure of an antenna device according to a ninth embodiment.

FIG. 12 is an explanatory diagram illustrating an example of a structure of an antenna device according to a tenth embodiment.

FIG. 13 is an explanatory diagram illustrating an example of a hardware configuration of the antenna device according to the tenth embodiment.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Also, in the following, description will be made in the below order.

1. Antenna Device according to First Embodiment
2. Antenna Device according to Second Embodiment
3. Antenna Device according to Third Embodiment
4. Antenna Device according to Fourth Embodiment
5. Antenna Device according to Fifth Embodiment
6. Antenna Device according to Sixth Embodiment
7. Antenna Device according to Seventh Embodiment
8. Antenna Device according to Eighth Embodiment
9. Antenna Device according to Ninth Embodiment 10. Antenna Device according to Tenth Embodiment 11. Antenna Device according to Eleventh Embodiment Also, in the following, an antenna device according to the present embodiment is, for example, a wearable device of a watch type that a user can wear on his or her wrist to use. Note that, the antenna device according to the present embodiment is not limited to the wearable device of the watch type. For example, the antenna device according to the present embodiment may be any wearable device that a user can wear on any area, such as an ankle and a waist, to use. Also, the antenna device according to the present embodiment can be applied to any device having a communication function.

(1) Antenna Device According to First Embodiment

FIG. 1 is an explanatory diagram illustrating an example of the structure of the antenna device according to the first embodiment. FIG. 1A to E depict an example of the antenna device according to the first embodiment, from different angles.

The antenna device according to the first embodiment includes a ground plate 106, a second antenna 104, and a first antenna 102, for example. One of the first antenna 102 and the second antenna 104 is a first antenna in the antenna device according to the first embodiment, and the other is a second antenna in the antenna device according to the first embodiment.

Also, the antenna device according to the first embodiment includes an electronic component 108 including an electronic circuit board, and a display device such as a liquid crystal display (hereinafter, referred to as "LCD"), for example. Here, on the electronic circuit board configuring the electronic component 108, one, two or more processors and various types of processing circuits that process a signal received by the antennas and execute transmission control for transmitting a signal from the antennas are mounted, for example. The antenna device according to the first embodiment executes a process for communication by the electronic component 108.

Note that, for example, when the process for communication is executed in a device outside the antenna device according to the first embodiment, the antenna device according to the first embodiment may be configured without the electronic circuit board. Also, the antenna device according to the first embodiment may be configured without a display device. That is, the antenna device according to the first embodiment may be configured without the electronic component 108.

The first antenna 102 and the second antenna 104 are each configured, for example, by either one antenna element or a plurality of antenna elements, and serve to transmit and receive signals. The first antenna 102 and the second antenna 104 may be antennas of a same structure or antennas of different structures.

The first antenna 102 and the second antenna 104 are, for example, an antenna for LTE and 3G, an antenna for a wireless local area network (WLAN), an antenna for communication in compliance with IEEE802.15.1 (hereinafter, sometimes referred to as "BT"), and an antenna for global positioning system (GPS). Also, the first antenna 102 and the second antenna 104 may be antennas of different communication methods, or antennas for a same communication method, for example.

The ground plate 106 has a spiral, or helix, shape. Also, for example, the ground plate 106 is made of material that allows a signal to be transmitted therethrough (for example, metal, etc.). A signal, such as a signal that is transmitted and received from the first antenna 102 and the second antenna 104 for example, is transmitted. That is, the ground plate 106 functions as a transmission path to transmit a signal.

The ground plate 106 is configured by one member or a plurality of members, for example. For example, the ground plate 106 configured by a plurality of members is structured such that a plurality of members made of above material are joined together by a joint part 110 described later.

The first antenna 102 is connected to one end of the ground plate 106 in the longitudinal direction. Also, the second antenna 104 is connected to the other end (an end opposite to the one end in the ground plate 106) of the ground plate 106 in the longitudinal direction. Here, connecting one component to another component in the present embodiment means electrically connecting the one component and the other component, or physically and electrically connecting the one component and the other component, for example.

As illustrated in P of FIG. 1A for example, the ground plate 106 includes a double winding part having a part wound one spire more than other parts. Note that the antenna device according to the present embodiment may be structured such that a part of the spiral ground plate 106 is wound one or more spires more than other parts, for example. In the following, the ground plate 106 is, for example, structured to include the double winding part, as illustrated in FIG. 1.

Also, a gap ("$b-2a$" in an example of FIG. 1) is provided between portions of the ground plate 106 at the double winding part of the ground plate 106, such that "$b>2a$" in P of FIG. 1.

As illustrated in FIG. 1, the ground plate 106 is shaped in a spiral, to suppress increase of a diameter of a roll of the ground plate 106, while also elongating the length of the ground plate 106 in the longitudinal direction.

Here, the length of the ground plate 106 in the longitudinal direction is, for example, ¼ or more of a wavelength corresponding to a lower limit of frequency used in communication.

For example, when the antenna device according to the first embodiment is compatible with communication in compliance with LTE (Long Term Evolution), the length of the ground plate 106 in the longitudinal direction is approximately 200 mm, which is equal to or more than ¼ of a wavelength corresponding to 700 MHz that is the lowermost region of usable frequencies at least, and which corresponds to approximately ½ of the wavelength. When the length of the ground plate 106 in the longitudinal direction is approximately 200 mm, the antenna device according to the first embodiment has antenna characteristics that satisfy a communication specification using a frequency from 700 MHz to 2700 MHz.

Note that the length in the longitudinal direction of the ground plate 106 included in the antenna device according to the present embodiment is not limited to approximately 200 mm, but may be a length according to frequencies used in communication.

Thus, the spiral ground plate 106 suppresses increase of the diameter of the roll of the ground plate 106 to reduce its size, and enables the antenna device to have characteristics corresponding to a comparatively wide band, such as several hundred MHz to several GHz.

Also, the ground plate 106 may have a joint part 110 which is provided in the middle of the spiral ground plate 106 for adjusting the length of the ground plate 106 in the longitudinal direction. The joint part 110 serves as what is called a joint. Here, the joint part 110 includes a spring or the like for example, to enable the length of the ground plate 106 in the longitudinal direction to be adjusted. Note that, the joint part 110 may include any member or mechanism capable of adjusting the length of the ground plate 106 in the longitudinal direction.

The joint part 110 is provided so that a user of the antenna device according to the first embodiment can adjust the length of the ground plate 106 in the longitudinal direction as appropriate. For example, when the antenna device according to the first embodiment is a wearable device, the joint part 110 is provided so that a user wearing the antenna device according to the first embodiment can adjust the length of the ground plate 106 in the longitudinal direction in such a manner that the length of the ground plate 106 in the longitudinal direction is a length that fits the user's own body when wearing the antenna device. Thus, the joint part 110 is provided to improve convenience for a user.

As illustrated in FIG. 1A for example, the joint part 110 is provided at another part that is not the double winding part (P illustrated in FIG. 1A, for example) in the ground plate 106. The joint part 110 is provided at the other part to make it easier for a user to adjust the length of the ground plate 106 in the longitudinal direction.

Although, in FIG. 1A, one joint part 110 is provided in the ground plate 106 for example, the joint part 110 provided in the ground plate 106 is not limited to an example illustrated in FIG. 1. For example, a plurality of joint parts 110 may be provided in the ground plate 106.

The joint part 110 is made of material that allows a signal to be transmitted therethrough (for example, metal, etc.) for example, and has electrical conductivity. When the joint part 110 has electrical conductivity, the ground plate 106 including the joint part 110 has electrical conductivity as a whole, to obtain antenna characteristics according to the length of the entire ground plate 106 in the longitudinal direction.

Note that the antenna device according to the first embodiment may be structured in such a manner that the joint part 110 does not have electrical conductivity, for example. When the joint part 110 does not have electrical conductivity, the joint part 110 is made of material having low electrical conductivity or insulator as a whole or in part, for example.

When the joint part 110 does not have electrical conductivity, the joint part 110 limits the length in the longitudinal direction of the ground plate 106 that functions as a transmission path of a signal. Thus, the joint part 110 does not have electrical conductivity, so that the antenna device according to the first embodiment does not use the entire ground plate 106 for example (for example, so as to obtain antenna characteristics for communication using a comparatively high frequency).

FIG. 2 is an explanatory diagram illustrating an example of the structure of the joint part 110 according to the present embodiment. FIG. 2 illustrates an example of the structure of the joint part 110 having the spring terminals 112. Also, FIG. 2 illustrates an example of the structure when the joint part 110 has electrical conductivity and a terminal of a USB (Universal Serial Bus) connector is utilized.

The spring terminals 112 are provided at an edge part of the ground plate 106 in the longitudinal direction, as illustrated in FIG. 2B for example. The electrical current flowing through the ground plate 106 is prone to concentrate on the edge part of the ground plate 106 in the longitudinal direction. Thus, the spring terminals 112 are provided at the edge part of the ground plate 106 in the longitudinal direction, to form a more stable transmission path of a signal.

Note that the spring terminals 112 are not necessarily provided at the edge part of the ground plate 106 in the longitudinal direction. For example, the joint part 110 may include a plurality of spring terminals 112 provided at the edge part of the ground plate 106 in the longitudinal direction or another part. As described above, the spring terminals 112 increase a connection area to form a more stable transmission path of a signal.

The spring terminals 112 are used to form a transmission path of a signal and to maintain the shape of the ground plate 106, for example. Note that, in the joint part 110, the spring terminals 112 may be used to form a transmission path of a signal, and the shape of the ground plate 106 may be maintained by another structure around the spring terminals 112.

When the terminal of the USB connector is utilized, as illustrated in FIG. 2B for example, one terminal (for example, a terminal corresponding to ground) of the USB connector is brought into contact with the spring terminals 112, to form a transmission path of a signal between the terminal of the USB connector and the spring terminals 112.

Note that an example of utilizing the terminal of the USB connector is not limited to an example illustrated in FIG. 2B. For example, a dedicated terminal for contacting with the spring terminals 112 may be provided outside the USB connector, to form a transmission path of a signal between the dedicated terminal and the spring terminals 112.

For example, as illustrated in FIG. 2, when the USB connector is utilized as the joint part 110, and the antenna device according to the first embodiment is a wearable device, the USB connector serves to connect portions of the ground plate 106, when a user wears the antenna device. Also, in the above, when the user does not wear the antenna device, the USB connector serves a normal USB function for connecting with another device compatible with USB (for example, a cradle, a personal computer (PC), etc.).

The joint part 110 according to the present embodiment includes a structure illustrated in FIG. 2, for example. Note that the structure of the joint part 110 according to the present embodiment is not limited to an example illustrated in FIG. 2, as a matter of course.

The antenna device according to the first embodiment has the structure illustrated in FIG. 1 for example, to obtain characteristics corresponding to a comparatively wide band that covers a low frequency area such as several hundred MHz to several GHz.

Also, the antenna device according to the first embodiment has the structure illustrated in FIG. 1 for example, to suppress increase of the diameter of the roll of the ground plate 106 to reduce its size.

Also, the antenna device according to the first embodiment has the structure illustrated in FIG. 1 for example, with a plurality of antennas including the first antenna 102 and the second antenna 104.

Note that the structure of the antenna device according to the first embodiment is not limited to the structure illustrated in FIG. 1.

For example, the antenna device according to the first embodiment may be structured without one of the first antenna 102 and the second antenna 104. That is, the antenna device according to the first embodiment may be structured with one antenna (the first antenna).

Also, the antenna device according to the first embodiment is structured without the joint part 110, for example.

Even when the above structure according to a variant example of the first embodiment is employed, the antenna device according to the variant example of the first embodiment includes the spiral ground plate 106 connected to the antenna for example, to have characteristics corresponding to a comparatively wide band that covers a low frequency area, in order to reduce its size.

Note that the structure of the antenna device according to the present embodiment is not limited to the antenna device according to the above first embodiment (including the variant example. ditto in the following). In the following, another example of the structure of the antenna device according to the present embodiment will be described. Note that, in the following, different structure from the antenna device according to the above first embodiment will be described mainly, based on the structure of the antenna device according to the above first embodiment.

(2) Antenna Device According to Second Embodiment

As described above, in the double winding part of the ground plate 106, a gap ("b-2*a*" in an example of FIG. 1) is provided between portions of the ground plate 106. In the antenna device according to the second embodiment, a larger gap between portions of the ground plate 106 is provided at the double winding part of the ground plate 106.

A larger gap between portions of the ground plate 106 provided at the double winding part of the ground plate 106 reduces coupling of parallel portions of the ground plate 106, making the ground plate length more independent.

FIG. 3 is an explanatory diagram illustrating an example of the structure of the antenna device according to the second embodiment. FIG. 3 illustrates the double winding part of the ground plate 106, and FIG. 3 also illustrates the first antenna 102 connected to the ground plate 106.

FIG. 3A illustrates an example of the gap between portions of the ground plate 106 that is made larger by shortening the length of the ground plate 106 in the short direction at the double winding part of the ground plate 106. As illustrated in FIG. 3A, when the length of the ground plate 106 in the short direction is made shorter, the gap between portions of the ground plate 106 is made larger, without changing the size of the antenna device according to the second embodiment from the size of the antenna device according to the first embodiment.

Also, FIG. 3B illustrates an example of the gap between portions of the ground plate 106, which is made larger without changing the length of the ground plate 106 in the short direction at the double winding part of the ground plate 106. As illustrated in FIG. 3B, when the gap between portions of the ground plate 106 is made larger without changing the length of the ground plate 106 in the short direction, impedance rise at the double winding part of the ground plate 106 is suppressed, despite the size of the antenna device according to the second embodiment that is larger than the antenna device according to the first embodiment.

The antenna device according to the second embodiment has the structure illustrated in FIG. 3 for example, to make the gap between portions of the ground plate 106 larger at the double winding part of the ground plate 106. Note that the structure for enlarging the gap between portions of the ground plate 106 at the double winding part is not limited to an example illustrated in FIG. 3, but can be any structure that enlarges the gap between portions of the ground plate 106.

(3) Antenna Device According to Third Embodiment

In the antenna device according to the third embodiment, portions of the ground plate 106 are connected by a circuit, at the double winding part in the ground plate 106. The circuit for connecting portions of the ground plate 106 is configured, for example, by mounted components (for example, a chip capacitor, a chip inductor, etc.) or board patterns (for example, spiral, meander, inter digital, etc.).

(3-1) First Example of Antenna Device According to Third Embodiment

FIG. 4 is an explanatory diagram illustrating the first example of the antenna device according to the third embodiment. FIG. 4 illustrates the double winding part of the ground plate 106, and FIG. 4 also illustrates the first antenna 102 connected to the ground plate 106.

As illustrated in FIG. 4A, portions of the ground plate 106 are connected by circuits 114. Here, although FIG. 4A illustrates an example of portions of the ground plate 106 connected by a plurality of circuits 114, the structure of the antenna device according to the third embodiment is not limited thereto. For example, the antenna device according to the third embodiment may be connected by one circuit 114.

(i) First Example of Circuits 114

The circuits 114 are, for example, parallel resonance circuits illustrated in FIG. 4B. FIG. 4B illustrates a parallel resonance circuit configured by an inductor having a predetermined inductance and a capacitor having a predetermined electrostatic capacitance. Note that the parallel resonance circuit according to the present embodiment is not limited to the configuration illustrated in FIG. 4B, but may be a parallel resonance circuit of any configuration such as a RLC parallel resonance circuit. Also, the circuits 114 may have a trap structure including a combination of a plurality of parallel resonance circuits.

Also, when a plurality of circuits 114 of the parallel resonance circuits are connected between portions of the ground plate 106, the resonance frequency of the circuits 114 may be of one kind or a plurality of kinds.

The circuits 114 of the parallel resonance circuits are connected between portions of the ground plate 106, to reduce coupling of parallel portions of the ground plate 106, making the ground plate length more independent.

(ii) Second Example of Circuits 114

Also, the circuits 114 are, for example, series resonance circuits illustrated in FIG. 4C. FIG. 4C illustrates a series resonance circuit configured by an inductor having a predetermined inductance and a capacitor having a predetermined electrostatic capacitance. Note that the series resonance circuit according to the present embodiment is not limited to the structure illustrated in FIG. 4C, but may be a series resonance circuit of any structure such as a RLC series resonance circuit. Also, the circuits 114 may have a filter structure of a combination of a plurality of series resonance circuits.

Also, when a plurality of circuits 114 of the series resonance circuits are connected between portions of the ground plate 106, the resonance frequency of the circuits 114 may be of one kind or a plurality of kinds.

The circuits 114 of the series resonance circuits are connected between portions of the ground plate 106, to form a transmission path for transmitting a signal between parallel portions of the ground plate 106, in the resonance frequency corresponding to the circuits 114. Thus, for example, when a plurality of circuits 114 of the series resonance circuits are connected between portions of the ground plate 106, and a plurality of resonance frequencies are present in a plurality of the circuits 114, a plurality of transmission paths are formed in the ground plate 106, resulting in a plurality of lengths of the ground plate 106 in the longitudinal direction which are present at the same time.

As described above, a plurality of lengths of the ground plate 106 in the longitudinal direction are present at the same time, to obtain a similar effect to a plurality of resonances given to the antenna. Accordingly, when a plurality of circuits 114 of the series resonance circuits are connected between portions of the ground plate 106, and a plurality of resonance frequencies are present in a plurality of the circuits 114, the antenna device according to the third embodiment has an increased number of operation frequencies.

(iii) Third Example of Circuits 114

Also, when a plurality of circuits 114 are connected between portions of the ground plate 106, the circuits 114 are neither limited to the structure according to the first example illustrated in above (i) nor the structure according to the second example illustrated in above (ii). For example, a plurality of the circuits 114 connected between portions of the ground plate 106 may be both of the parallel resonance circuits according to the first example illustrated in above (i) (or a trap structure) and the series resonance circuits according to the second example illustrated in above (ii) (or a filter structure).

For example, in the antenna device according to the third embodiment, the parallel resonance circuits according to the first example illustrated in above (i) (or a trap structure) are provided as the circuits 114 corresponding to a low frequency (for example, 700 MHz etc.) whose ground plate length is to be elongated, among a plurality of the circuits 114. Also, for example, in the antenna device according to the third embodiment, the series resonance circuits according to the second example illustrated in above (ii) (or a filter structure) is provided as the circuits 114 corresponding to the frequency (for example, 1400 MHz to 1900 MHz, 2100 MHz, 2700 MHz etc.), for which a plurality of ground plate lengths are preferably present at the same time.

As described above, by providing both of the parallel resonance circuits according to the first example illustrated in above (i) (or a trap structure) and the series resonance circuits according to the second example illustrated in above (ii) (or a filter structure), the antenna device according to the third embodiment can broaden its operation frequency band.

(3-2) Second Example of Antenna Device According to Third Embodiment

Note that, in the antenna device according to the third embodiment, the circuit for connecting portions of the ground plate 106 is not limited to the first example of the above third embodiment. For example, the circuit for connecting portions of the ground plate 106 may be a structure including a switch for switching a transmission path of a signal in the ground plate 106.

The circuit including the switch is connected between portions of the ground plate 106, and the switch is turned on, in order to form a transmission path for transmitting a signal between parallel portions of the ground plate 106. Thus, the circuit including the switch is connected between portions of the ground plate 106, and the switch is turned on or off, so that a plurality of lengths of the ground plate 106 in the longitudinal direction are present at the same time.

The switch according to the present embodiment included in the circuit for connecting portions of the ground plate 106 is, for example, a switching circuit of any configuration which is configured by a switching element such as a MOSFET (Metal-Oxide-Semiconductor Field-Effect Transistor), a MEMS (Micro Electro Mechanical Systems) switch, and a plurality of switching elements. Also, on-off control of the switch included in the circuit connected between portions of the ground plate 106 are executed, for example, by a processor of an electronic circuit board included in the electronic component 108 or an external device capable of controlling communication in the antenna device according to the third embodiment (for example, a remote controller, etc.).

Also, the circuits for connecting portions of the ground plate 106 may be provided on one portion at the double winding part of the ground plate 106, and structured to further include a first circuit connected to the switch and a second circuit connected to the switch provided on another portion at the double winding part. When the first circuit and the second circuit are included in addition, the switch included in the circuit for connecting portions of the ground plate 106 serves to switch between the first circuit and the second circuit.

The switch included in the circuit for connecting portions of the ground plate 106 further switches between the first circuit and the second circuit, to change the circuit connected to the antenna, so that the antenna device according to the third embodiment can broaden its operation frequency band.

FIG. 5 is an explanatory diagram illustrating the second example of the antenna device according to the third embodiment.

As illustrated in FIG. 5A, portions of the ground plate 106 are connected by circuits 116. Also, as illustrated in FIG. 5B for example, the circuits 116 include a switch 118, a first circuit 120 (a first circuit or a second circuit), and a second circuit 122 (a second circuit or a first circuit). FIG. 5B illustrates a first antenna 102 as well.

In FIG. 5A, the first circuit 120 is provided on a side to which the first antenna 102 is connected at the double winding part of the ground plate 106, and the second circuit 122 is provided on a side to which the first antenna 102 is not connected at the double winding part, for example. Note that the second circuit 122 may be provided on a side to which the first antenna 102 is connected at the double winding part of the ground plate 106, and the first circuit 120 may be provided on a side to which the first antenna 102 is not connected at the double winding part.

Also, although FIG. 5B illustrates an example in which the first circuit 120 and the second circuit 122 are each configured by an inductor and a capacitor, each of the first circuit 120 and the second circuit 122 may have any structure that changes antenna characteristics in the antenna device according to the third embodiment.

(4) Antenna Device According to Fourth Embodiment

FIG. 6 is an explanatory diagram illustrating an example of the structure of the antenna device according to the fourth embodiment.

As illustrated in P of FIG. 6, in the ground plate 106 included in the antenna device according to the fourth embodiment, the length of a part of the ground plate 106 in the short direction is longer than the lengths of other parts in the short direction. Note that a part having a longer length than the lengths of the other parts in the short direction in the ground plate 106 is not limited to the position illustrated in P of FIG. 6. Also, in the antenna device according to the fourth embodiment, a plurality parts having a longer length than the lengths of the other parts in the short direction may be provided in the ground plate 106.

As illustrated in FIG. 6, the length of a part of the ground plate 106 in the short direction is made longer than the other parts, so that electrical current flowing in the edge of the ground plate 106 along the longitudinal direction is dispersed. As described above, the electrical current flowing through the ground plate 106 is prone to concentrate on the edge part of the ground plate 106 in the longitudinal direction. Thus, for example, when the antenna device according to the fourth embodiment is a wearable device, the antenna device according to the fourth embodiment reduces SAR (Specific Absorption Rate).

(5) Antenna Device According to Fifth Embodiment

FIG. 7 is an explanatory diagram illustrating an example of the structure of the antenna device according to the fifth embodiment.

As illustrated in P of FIG. 7, an area of the ground plate 106 is cut out in the ground plate 106 included in the antenna device according to the fifth embodiment. Note that the area cut out in the ground plate 106 is not limited to the position illustrated in P of FIG. 7. Also, a plurality of areas may be cut out in the antenna device according to the fifth embodiment.

As illustrated in FIG. 7, a part of the ground plate 106 is cut out to change a path of electrical current flowing in the ground plate 106. Thus, the antenna device according to the fifth embodiment can broaden its operation frequency band.

(6) Antenna Device According to Sixth Embodiment

FIG. 8 is an explanatory diagram illustrating an example of the structure of the antenna device according to the sixth embodiment. FIG. 8 illustrates the antenna device according to the sixth embodiment, which is worn on a left wrist of a user.

When the antenna device according to the sixth embodiment is a wearable device, the ground plate 106 included in the antenna device according to the sixth embodiment is structured in such a manner that a part of the ground plate 106 is bent so as to provide a gap relative to a user wearing the antenna device according to the sixth embodiment.

The position at which the ground plate 106 is bent is, for example, edge parts of the ground plate 106 along the longitudinal direction, as illustrated in P1 and P2 of FIG. 8. Also, the ground plate 106 is bent so as to provide a gap relative to a user wearing the antenna device according to the sixth embodiment, and thus is bent so as to get away from the user wearing the antenna device according to the sixth embodiment. As described above, the electrical current flowing through the ground plate 106 is prone to concentrate on the edge part of the ground plate 106 in the longitudinal direction. Thus, for example, as illustrated in P1 and P2 of FIG. 8, edge parts of the ground plate 106 along the longitudinal direction are bent so that the antenna device according to the sixth embodiment reduces SAR.

Note that, although FIG. 8 illustrates an example in which two portions at P1 and P2 are bent in the ground plate 106, the antenna device according to the sixth embodiment may be structured in such a manner that an edge part at one of P1 or P2 illustrated in FIG. 8 is bent.

(7) Antenna Device According to Seventh Embodiment

FIG. 9 is an explanatory diagram illustrating an example of the structure of the antenna device according to the seventh embodiment.

The ground plate 106 included in the antenna device according to the seventh embodiment includes a third antenna (third antenna) formed as illustrated in P of FIG. 9. The third antenna according to the present embodiment is formed by transforming a part of the ground plate 106, for example.

The third antenna according to the present embodiment is, for example, an antenna for LTE and 3G, an antenna for wireless LAN, an antenna for communication in compliance with IEEE802.15.1, and an antenna for GPS. Also, the third antenna according to the present embodiment may be, for example, an antenna of a different communication method from the first antenna 102 and the second antenna 104, or an antenna of a same communication method as the first antenna 102 and the second antenna 104.

Note that, the position at which the third antenna according to the present embodiment is formed in the ground plate 106 is not limited to the position illustrated in FIG. 9, as a matter of course. Also, the antenna device according to the seventh embodiment may be structured to further include an antenna of the same communication method as the third antenna according to the present embodiment, or an antenna of a different communication method from the third antenna according to the present embodiment, for example.

(8) Antenna Device According to Eighth Embodiment

FIG. 10 is an explanatory diagram illustrating an example of the structure of the antenna device according to the eighth embodiment.

The antenna device according to the eighth embodiment further include, for example, a fourth antenna 124 connected to the ground plate 106 (fourth antenna).

The fourth antenna 124 is, for example, an antenna for LTE and 3G, an antenna for wireless LAN, an antenna for communication in compliance with IEEE802.15.1, and an antenna for GPS. Also, the fourth antenna 124 may be, for example, an antenna of a different communication method from the first antenna 102 and the second antenna 104, or an antenna of a same communication method as the first antenna 102 and the second antenna 104.

Also, as illustrated in P of FIG. 10 for example, in the ground plate 106 included in the antenna device according to the eighth embodiment, an element for preventing coupling with another antenna connected to the fourth antenna 124 and the ground plate (for example, the first antenna 102 and the second antenna 104) is formed. The above element formed in the ground plate 106 is, for example, a reflector. The above element such as the reflector is formed by transforming a part of the ground plate 106, for example.

The antenna device according to the eighth embodiment includes a ground plate 106 on which the above element is formed, to prevent interference of communications that use close (or overlapped) frequency bands for communication, such as LTE using a frequency band of 2 GHz or higher and WLAN using a frequency band of 2.4 GHz.

(9) Antenna Device According to Ninth Embodiment

FIG. 11 is an explanatory diagram illustrating an example of the structure of the antenna device according to the ninth embodiment.

For example, as illustrated in FIG. 1, in the antenna device according to the present embodiment, the ground plate 106 and an antenna connected to an end of the ground plate 106 in the longitudinal direction (for example, the first antenna 102, the second antenna 104) are not in contact with each other, except a connected area therebetween. That is, a gap is provided between the antenna and the ground plate 106 in areas other than the area connected with the ground plate 106 in the antenna. For example, as illustrated in FIG. 11A, the antenna device according to the ninth embodiment includes a circuit 126 for connecting the ground plate 106 and the antenna in the areas other than the above connected area.

Note that, although FIG. 11 illustrates the circuit 126 for connecting the ground plate 106 and the first antenna 102, the antenna device according to the ninth embodiment may further includes a circuit for connecting the ground plate 106 and the second antenna 104. Also, the antenna device according to the ninth embodiment may be structured to include a circuit for connecting the ground plate 106 and the second antenna 104, without the circuit 126.

FIG. 11B illustrates an example of the structure of the circuit 126. FIG. 11B also illustrates the first antenna 102 and the ground plate 106. The structure of the circuit 126 is not limited to the structure illustrated in FIG. 11B, but can have any structure capable of isolating the antenna and the ground plate 106 from each other or capable of enlarging the operation frequency band, for example.

(10) Antenna Device According to Tenth Embodiment

Although the antenna device according to the first embodiment illustrated in FIG. 1 is structured to include the antennas (the first antenna 102 and the second antenna 104) and the ground plate 106 and further includes the electronic component 108, the component that the antenna device according to the present embodiment further includes is not limited to the electronic component 108.

FIG. 12 is an explanatory diagram illustrating an example of the structure of the antenna device according to the tenth embodiment. FIG. 12 illustrates an example of the antenna device that includes components 128A, 128B (hereinafter, collectively referred to as "components 128".) in addition to the antenna device according to the first embodiment illustrated in FIG. 1. The components 128 are, for example, a processing circuit, a battery such as a secondary battery, and an image capturing device.

FIG. 13 is an explanatory diagram illustrating an example of the hardware configuration of the antenna device according to the tenth embodiment.

The antenna device according to the tenth embodiment includes a hardware illustrated below, for example. Note that the hardware configuration of the antenna device according to the tenth embodiment is not limited to an example illustrated below, as a matter of course.

Processors and various types of processing circuits, a ROM (Read Only Memory) and a RAM (Random Access Memory), an IC having a storage medium such as a flash memory (for example, a system IC illustrated in FIG. 13)

An operation interface that a user can operate (for example, a touch sensor illustrated in FIG. 13)

A display device that displays various images on a display screen (for example, an LCD illustrated in FIG. 13)

An input and output interface (for example, USB and SDIO illustrated in FIG. 13)

A communication interface (for example, WWAN (LTE), WLAN, BT, GPS, MHL (Mobile High-definition Link) (registered trademark), NFC (Near Field Communication), and each antenna illustrated in FIG. 13)

An imaging capturing device such as a digital still camera and a digital video camera (for example, a camera illustrated in FIG. 13)

An audio output device configured by a speaker and the like (for example, an audio device illustrated in FIG. 13)

A power supply device (for example, a battery and a wireless power feeding circuit illustrated in FIG. 13)

(11) Antenna Device According to Eleventh Embodiment

The antenna device according to the eleventh embodiment is structured as a combination of two or more of antenna devices according to the above second to tenth embodiments.

In the above, although the antenna device is described as the present embodiments, the present embodiment is not limited to such forms. The present embodiment may be applied to any wearable device such as, for example, a wearable device of a watch type that is worn on a wrist to use, a wearable device of a glasses type, and a wearable device that is worn on any part such as an ankle and a waist to use. Also, the present embodiment may be applied to various devices having a communication function, which is for example a communication device such as a smartphone and a mobile phone, a tablet device, a computer such as a PC, a video and music player (or a video and music recording and reproducing device), and a game machine.

It should be understood by those skilled in the art that various modifications, combinations, sub-combinations and alterations may occur depending on design requirements and other factors insofar as they are within the scope of the appended claims or the equivalents thereof.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An antenna device including:

a first antenna; and a spiral ground plate connected to the first antenna at one end in a longitudinal direction to transmit a signal, wherein the ground plate includes a double winding part having a part wound one spire more than other parts.

(2)

The antenna device according to (1), wherein a length of the ground plate in the longitudinal direction is equal to or longer than ¼ of a wavelength corresponding to a lower limit of frequency used in communication.

(3)

The antenna device according to (1) or (2), further including a second antenna connected to the ground plate at another end opposite to the one end in the longitudinal direction.

(4)

The antenna device according to any one of (1) to (3), wherein the ground plate includes a joint part provided in a middle of the spiral ground plate for adjusting a length of the ground plate in the longitudinal direction.

(5)

The antenna device according to (4), wherein the joint part is provided in the ground plate at the other parts that is not the double winding part.

(6)

The antenna device according to (4) or (5), wherein the joint part does not have electrical conductivity.

(7)

The antenna device according to any one of (1) to (6), wherein a larger gap is provided between portions of the ground plate at the double winding part of the ground plate.

(8)

The antenna device according to any one of (1) to (7), wherein the portions of the ground plate are connected by one, two or more circuits at the double winding part of the ground plate.

(9)

The antenna device according to (8), wherein the circuit is a parallel resonance circuit.

(10)

The antenna device according to (8), wherein the circuit is a series resonance circuit.

(11)

The antenna device according to (8), wherein the portions of the ground plate are connected by the two or more circuits, and the two or more circuits include a parallel resonance circuit and a series resonance circuit.

(12)

The antenna device according to (8), wherein the circuits include a switch configured to switch a transmission path of a signal in the ground plate.

(13)

The antenna device according to (12), wherein the circuits further include a first circuit connected to the switch and provided on one portion in the double winding part of the ground plate, and a second circuit connected to the switch and provided on another portion in the double winding part of the ground plate, and the switch further switches between the first circuit and the second circuit.

(14)

The antenna device according to any one of (1) to (13), wherein a part of the ground plate has a length in a short direction that is longer than lengths of other parts in the short direction.

(15)

The antenna device according to any one of (1) to (14), wherein a part of the ground plate is cut out.

(16)

The antenna device according to any one of (1) to (15), wherein the antenna device is a wearable device that a user can wear to use, and a part of the ground plate is bent in such a manner to form a gap relative to a user wearing the antenna device.

(17)

The antenna device according to any one of (1) to (16), wherein a third antenna is formed in the ground plate.

(18)

The antenna device according to any one of (1) to (17), further including a fourth antenna connected to the ground plate, wherein an element that prevents coupling with another antenna connected to the fourth antenna and the ground plate is formed in the ground plate.

(19)

The antenna device according to any one of (1) to (18), wherein the ground plate and the antenna connected to the end of the ground plate in the longitudinal direction are not in contact with each other, except a connected part therebetween, and the antenna device further includes a circuit that connects the ground plate and the antenna at a part other than the connected part.

(20)

An antenna device, including:

at least one antenna configured to transmit and receive communication signals; and a helix ground plate connected to the at least one antenna, wherein the helix ground plate includes an overlapping part, and has a length of at least one-quarter of a wavelength of a lowest-frequency in the communication signals.

(21)

The antenna device of (20), wherein the at least one antenna includes a first antenna connected to a first end of the helix ground plate and a second antenna connected to a second end of the helix ground plate that is opposite the first end.

(22)

The antenna device of (20) or (21), further including:

a joint disposed in the helix ground plate at a location other than the overlapping part, the joint being configured to adjust a length of the helix ground plate.

(23)

The antenna device of any one of (20) to (22), wherein a gap is provided between sections of the helix ground plate in the overlapping part.

(24)

The antenna device of (21), wherein each of the first antenna and the second antenna include a plurality of antenna elements.

(25)

The antenna device of (21) or (24), wherein the first antenna and the second antenna have different structures.

(26)

The antenna device of any one of (21) and (24) to (25), wherein the first antenna and the second antenna have a same structure.

(27)

The antenna device of any one of (21) and (24) to (26), wherein the first and second antennas are configured to communicate via a wireless local area network, via long term evolution (LTE) communication, third generation wireless communication (3G), or via Bluetooth communication.

(28)

The antenna device of (27), wherein both the first and the second antennas are configured to communication via a same communication method.

(29)

The antenna device of (27) or (28), wherein the first and the second antennas are configured to communicate via different communication methods.

(30)

The antenna device of any one of (21) and (24) to (29), wherein at least one of the first antenna and the second antenna is a global positioning system (GPS) antenna.

(31)

The antenna device of (22), wherein the joint part includes a spring.

(32)

The antenna device of (22) or (31), wherein the joint is made of an electrically conductive material.

(33)

The antenna device according to any one of (22) and (31) to (32), wherein the joint is made of a material that is not electrically conductive.

(34)

The antenna device of any one of (22) and (31) to (33), wherein the joint includes a universal serial bus (USB) connector.

(35)

The antenna device of any one of (22) and (31) to (34), wherein one portion of the helix ground plate includes the USB connector and another portion of the helix ground plate includes spring terminals to connect to the USB connector.

(36)

The antenna device of (23), wherein widths of the sections of the helix ground plate are reduced in the overlapping part to create the gap.

(37)
The antenna device of (23) or (36), wherein the gap is created by offsetting the sections of the helix ground plate in the overlapping part.
(38)
The antenna device of any one of (20) to (37), wherein at least one circuit interconnects the portions of the helix ground plate in the overlapping part.
(39)
The antenna device of (39), wherein the at least one circuit includes a parallel resonance circuit.
(40)
The antenna device of (38) or (39), wherein the at least one circuit includes a series resonant circuit.
(41)
The antenna device of any one of (38) to (40), wherein the at least one circuit includes a switch that selectively connects one of a parallel resonant circuit and a series resonant circuit.
(42)
The antenna device of (31), wherein the parallel resonant circuit includes a trap structure and the series resonant circuit includes a filter structure.
(43)
The antenna device of (31) or (32), wherein the switch is a metal-oxide-semiconductor field effect transistor (MOSFET).
(44)
The antenna device of any one of (41) to (43), wherein the switch is a micro electromechanical systems (MEMS) switch.
(45)
The antenna device of (41) to (44), wherein the helix ground plate includes a portion having a greater width than other portions of the helix ground plate, the portion having the greater width being disposed at a location other than the overlapping part.
(46)
The antenna device of any one of (20) to (45), wherein the helix ground plate includes a plurality of holes in a portion disposed at a location other than the overlapping part.
(47)
The antenna device of any one of (20) to (46), wherein edge portions of the helix ground plate are bent at a predetermined angle to provide a gap between the edge portions and a wearer of the antenna device.
(48)
The antenna device of any one of (21), (24), (25), (26), (27) or (30), further comprising a third antenna connected to the helix ground plate at a location other than the overlapping part.
(49)
The antenna device of (48), wherein the third antenna is integrated into the helix ground plate.
(50)
The antenna device of (48) or (49), wherein the third antenna is configured to communicate with a same communication method of at least one of the first antenna and the second antenna.
(51)
The antenna device of any one of (48) to (50), wherein the third antenna is configured to communication with a different communication method from the first antenna and the second antenna.
(52)
The antenna device of any one of (48) to (51), wherein the helix ground plate includes a structure to prevent coupling of the third antenna with at least one of the first and second antennas.
(53)
The antenna device of (52), wherein the structure to prevent coupling includes a reflector.
(54)
A device including:

at least one antenna configured to transmit and receive communication signals;

a helix ground plate connected to the at least one antenna, the helix ground plate including an overlapping part and having a length of at least one-quarter of a wavelength of a lowest-frequency in the communication signals; and a display.
(55)
The device according of (54), wherein the display includes a liquid crystal display (LCD).
(56)
The device of (55), further comprising a processing circuit, a battery and an image capturing device.
(57)
The device according of (56), further comprising a wireless power feeding circuit configured to charge the battery.
(58)
The device of (54) or (55), wherein the device is a wearable device to be worn by a user.
(59)
The device of (58), wherein the device is configured to be worn on a wrist of the user.
(60)
The device of (59), wherein the device is a watch.

REFERENCE SIGNS LIST

102 first antenna
104 second antenna
106 ground plate
108 electronic component
110 joint part
112 spring terminal
114, 116, 126 circuit
118 switch
120 first circuit
122 second circuit
124 fourth antenna
128 component

The invention claimed is:

1. An antenna device, comprising:

at least one antenna configured to transmit and receive communication signals; and a helix ground plate connected to the at least one antenna, wherein the at least one antenna extends from an end of the helix ground plate in a longitudinal direction, the helix ground plate includes an overlapping part, and has a length of at least one-quarter of a wavelength of a lowest-frequency in the communication signals, and the helix ground plate and the at least one antenna form a helical shape, wherein at least one circuit interconnects the portions of the helix ground plate in the overlapping part, the at least one circuit includes a switch that selectively connects one of a parallel resonant circuit and a series resonant circuit, and the parallel resonant circuit includes a trap structure and the series resonant circuit includes a filter structure.

2. The antenna device according to claim 1, wherein the at least one antenna includes a first antenna connected to a first end of the helix ground plate and a second antenna connected to a second end of the helix ground plate that is opposite of the first end.

3. The antenna device according to claim 1, further comprising:

a joint disposed in the helix ground plate at a location other than the overlapping part, the joint being configured to adjust a length of the helix ground plate.

4. The antenna device according to claim 1, wherein a gap is provided between sections of the helix ground plate in the overlapping part.

5. The antenna device according to claim 2, wherein the first and second antennas are configured to communicate via a wireless local area network, via long term evolution (LIE) communication, third generation wireless communication (3G), or via Bluetooth communication.

6. The antenna device according to claim 5, wherein the first and the second antennas are configured to communicate via different communication methods.

7. The antenna device according to claim 2, wherein at least one of the first antenna and the second antenna is a global positioning system (GPS) antenna.

8. The antenna device according to claim 1, wherein the at least one circuit includes a parallel resonance circuit.

9. The antenna device according to claim 1, wherein the switch is a metal-oxide-semiconductor field effect transistor (MOSFET).

10. The antenna device according to claim 1, wherein the switch is a micro electromechanical systems (MEMS) switch.

11. A device comprising:

at least one antenna configured to transmit and receive communication signals;

a helix ground plate connected to the at least one antenna, the at least one antenna extending from an end of the helix ground plate in a longitudinal direction, the helix ground plate including an overlapping part and having a length of at least one-quarter of a wavelength of a lowest-frequency in the communication signals, and the helix ground plate and the at least one antenna forming a helical shape, wherein at least one circuit interconnects the portions of the helix ground plate in the overlapping part, the at least one circuit includes a switch that selectively connects one of a parallel resonant circuit and a series resonant circuit, and the parallel resonant circuit includes a trap structure and the series resonant circuit includes a filter structure; and a display.

12. The device according to claim 11, wherein the display includes a liquid crystal display (LCD).

13. The device according to claim 12, further comprising:

a processing circuit, a battery and an image capturing device.

14. The device according to claim 13, further comprising:

a wireless power feeding circuit configured to charge the battery.

15. The device according to claim 11, wherein the device is a wearable device to be worn by a user.

16. The device according to claim 15, wherein the device is configured to be worn on a wrist of the user.

17. The device according to claim 16, wherein the device is a watch.

* * * * *